| United States Patent [19] | [11] | 4,321,241 |
|---|---|---|
| Bechthold | [45] | Mar. 23, 1982 |

[54] PROCESS FOR THE PURGING OF FLUE GASES CONTAINING ACIDIC COMPONENTS

[75] Inventor: Horst Bechthold, Erftstadt-Friesheim, Fed. Rep. of Germany

[73] Assignee: FA. Maschinenfabrik Buckau R. Wolf AG, Grevenbroich, Fed. Rep. of Germany

[21] Appl. No.: 115,293

[22] Filed: Jan. 25, 1980

[30] Foreign Application Priority Data

Feb. 5, 1979 [DE] Fed. Rep. of Germany ....... 2904263

[51] Int. Cl.$^3$ ............................................. C01B 17/00
[52] U.S. Cl. .................................... 423/242; 423/420
[58] Field of Search .......... 423/242 A, 242 R, 244 A, 423/244 R, 232, 233, 420

[56] References Cited

U.S. PATENT DOCUMENTS 1,916,980  7/1933  Horevitz ............................. 423/242

Primary Examiner—O. R. Vertiz
Assistant Examiner—Gregory A. Heller
Attorney, Agent, or Firm—Michael J. Striker

[57] ABSTRACT

Flue gas containing sulfur dioxide, carbon dioxide and other acidic components is desulfurized by washing it with an aqueous washing solution to which ammonia has been added in the stoichiometrically necessary amount for reaction with the sulfuroxides. The addition of the ammonia is so controlled that a predetermined amount of ammonium carbonate is maintained in the washing solution.

6 Claims, 1 Drawing Figure

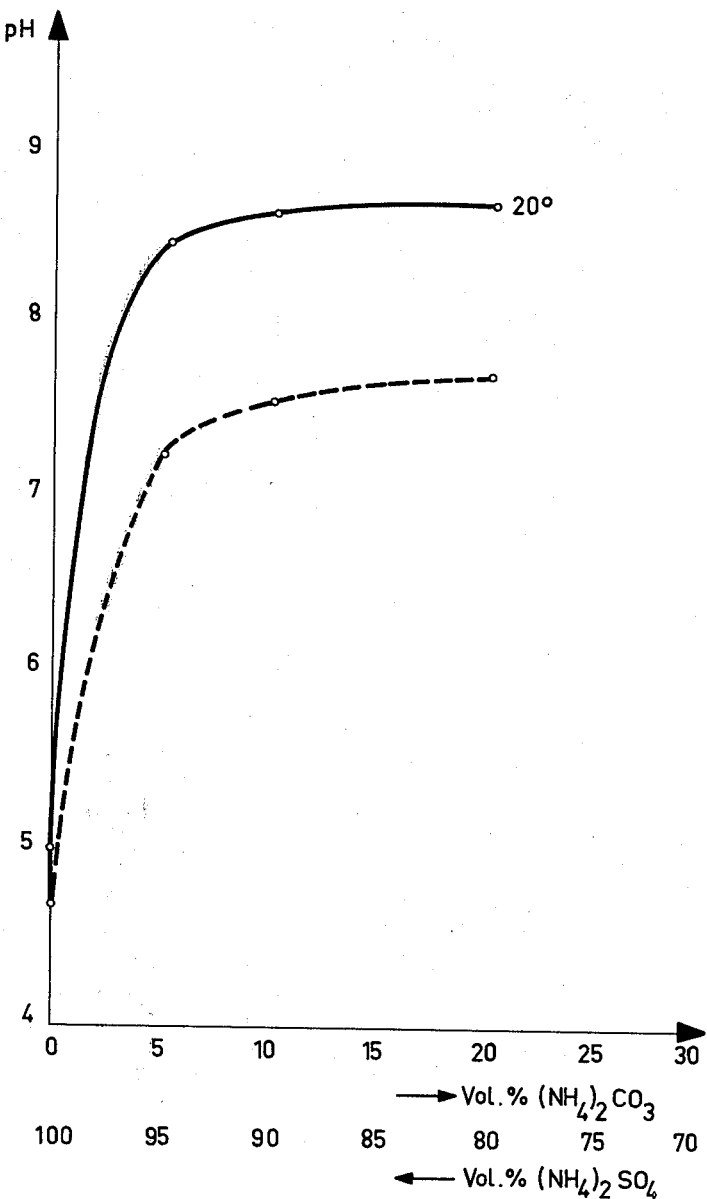

PROCESS FOR THE PURGING OF FLUE GASES CONTAINING ACIDIC COMPONENTS

BACKGROUND OF THE INVENTION

The invention relates to a process for the purging of flue gases containing acidic components, in particular sulfur dioxide, wherein the purging is effected in a washing fluid containing ammonia.

A series of processes is known, based upon desulfurization using ammoniacal solutions. In these processes various equilibrium reactions simultaneously occur in the washing tower, for instance the following:

$$SO_2 + 2NH_3 + H_2O \rightleftharpoons (NH_4)_2SO_3 \text{ ammoniumsulfite}$$

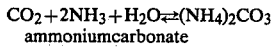

$$CO_2 + 2NH_3 + H_2O \rightleftharpoons (NH_4)_2CO_3$$
ammoniumcarbonate

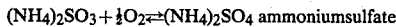

$$(NH_4)_2SO_3 + \tfrac{1}{2}O_2 \rightleftharpoons (NH_4)_2SO_4 \text{ ammoniumsulfate}$$

As appears from these equations, a certain proportion of ammoniumsulfate is formed in the wash solution, irrespective of either flue gas concentration and oxygen content or operating temperature.

While the pH value of ammoniumsulfite and ammonium carbonate is between 7 and 8, the pH of a pure ammoniumsulfate solution is about between 4 and 5.

Other known processes for the desulfurization of flue gases determine the amount of ammonia to be added by the pH measured in the washing tower (West German published application No. 24 31 130). While in principle this kind of control is possible, it has the critical disadvantage that it can be effectively used only with low ammonium carbonate contents. In this connection reference is made to the FIGURE 1.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing of FIGURE 1 shows variations in the pH value or mixtures of saturated solutions of $(NH_4)_2CO_3$ and $(NH_4)_2SO_4$, depending on the ratio of the saturated solutions.

DESCRIPTION OF THE PREFERRED EMBODIMENT

As appears from the FIG. 1 the pH in the area of low ammonium carbonate is of a steep grade. The curves then, however, turn in a short transitional area almost to a horizontal direction, and gradually approach the pH of a pure ammonium carbonate solution.

It is, however, a fact that a flawless control of the process is possible only where a distinct effect is produced when changing one of the determining factors. In the case under consideration, the amount of ammonia to be added would be influenced by a variation of the pH. An increase of the ammonia addition would, however, result in an increase of the ammonium carbonate contents in the solution. The pH unfortunately varies quite clearly only in the lower area of increasing carbonate contents, while above 5% carbonate it hardly changes.

Thus, this kind of control of the process can be practically used only up to 5%. It involves substantial difficulties as soon as the pH curve changes to the horizontal direction. Tests in actual operation have shown that a good control of the process is no longer possible above a pH of about 7.

Desulfurization plants for flue gases are nowadays mainly designed for use in major power stations. In countries like the Federal Republic of Germany there is, however, a substantial proportion of power stations which are operated under typical conditions of peak load stations. In these cases variations of the load are frequently of great magnitude. Such variations constitute a severe demand for the functioning of the desulfurization process. Assuming that the contents of sulfuroxides in the gas is constant, the ammonia addition in these cases would have to be proportional to the amount of gas if variations of the load affecting the desulfurization outcome are to be prevented.

It would seem that the ammonia addition could therefore be adjusted depending on the amount of gas. However, measuring these large volumes of gas in frequently constrained places in the large flue gas channels involves substantial errors which themselves would already have a negative effect on maintaining the degree of desulfurization constant. On the other hand, it is normal that in case of load variations, the air excess factor of the boiler furnace changes, and the sulfuroxide contents in the crude gas accordingly cannot remain constant. If these errors in measurements are avoided, an adjustment which would change the ammonia contents in proportion to the volume of the gas would still result in different degrees of desulfurization because of the varying $SO_2$ contents during different load periods.

It is furthermore a characteristic of adjustment procedures that, in case of a rapid change in the critical terms or amounts, the adjustment system will have a tendency to fluctuate. For this reason it is necessary that adjustments which are exposed to large variations on the measured input side must be set for a slow response in order that for an input item, that is in this case the volume of gas, considerable deviations from the desired value be tolerated for a certain period of time.

These considerations apply also to adjustments which, for instance, based on the pH of the washing solution, change the addition of ammonia during the desulfurization operation. In this case one would have to expect also a not insubstantial breakthrough of sulfuroxides in the washing system, though for a limited time only, in all cases where a substantial rapid increase of the load occurs.

A process for the desulfurization of flue gases has also been proposed which operates with extremely high salt concentrations. It has been found in using this process, that a useful control of the ammonium contents, in cases of load variations, is not possible even in that area where the pH changes by a steep gradient on the curve.

The present invention therefore has the object of providing for a control operation, if necessary, upon change of the general conditions of the process, which even in cases of rapid and large load variations does not result in a change in the degree of precipitation during the desulfuring operation.

The above reproduced reaction equations show that, after most of the adsorption of the sulfuroxide has taken place, any still occurring excess of ammonia must react to form ammonium carbonate because of the high contents of carbon dioxide in the flue gas. It is, however, a fact known from thermodynamics that ammonium carbonate is already almost completely decomposed at 60° into its components, that is ammonia, water vapor and carbon dioxide. With the temperatures used in the washing tower it could therefore not be expected that substantial amounts of ammonium carbonate in the solution would be firmly constant. Heretofore, the process was carried out in a manner that as low as possible an ammonium carbonate contents remain in the solution, so that as low as possible a vapor pressure of the ammonia could be obtained in the flue gas above the washing solution. Apart from the high cost of a loss of ammonia, a high content of ammonia also was inadmissible in the purified gas for environmental reasons.

In spite of the steep grade of the pH development in the region of low ammonium carbonate concentrations and the resulting rapid onset of an adjustment it was heretofore not possible to take up variations of the load without affecting the degree of desulfurization.

It could be thought in case of an excess of ammonia in the washing solution that ammonium carbonate would be formed, which in turn could combine with the sulfuroxide suddenly appearing in excess by release of carbon dioxide from the flue gases. In this manner a buffer effect could be obtained which for a limited period of time would be sufficient to preserve the degree of desulfurization even without any special adjustment in case of variations of the load.

The use of higher ammonium carbonate contents, however, appeared to be not permissible because of the already referred to fact that ammonium carbonate decomposes into its gaseous components at the comparatively low temperature of 60° C. This would result in a high ammonia partial pressure in the gas which not only would cause substantial loss of ammonia but would also pollute the environment upon discharge of the gases.

In spite of these facts attempts have been made to obtain a reliable adjustment by operating the apparatus in the area of higher ammonium carbonate contents such as 30%. However, the desired effect was surprizingly not obtained since even with this kind of operation the ammonia contents which could be detected by chemical analysis remained below the threshhold of determination in the gas. Smelling tests, likewise, could not discover any ammonia.

Through this manner of operation the desired braking effect was accomplished. Variations of the load no longer affected the degree of desulfurization, though there was no immediate separate adjustment. This entire proceeding, however, shifted the problem into the technology of regulating the process since, as appears from the curve of FIG. 1, the pH in this area of ammonium carbonate concentration was almost constant. An adjustment on the basis of the pH value therefore was also found to be unsatisfactory.

SUMMARY OF THE INVENTION

According to the invention there is first determined the carbon contents of the washing solution as a measure for the carbon dioxide which would bind the ammonia. Starting from this value the adjustment of the amount of added ammonia could be carried out. With this manner of approach it is possible to bring the amount of ammonia necessary for the desulfurization in conformity with the stoichiometric amount of the sulfuroxides present. In addition, there is secured a sufficient amount of ammonium carbonate in the washing solution to absorb load variations. In general, 2-60 percent by weight of ammonium carbonate should be maintained in the washing solution. Preferably, the level is maintained at 5-30 percent of the solutions.

Forming such desired ammonium carbonate supply in the washing solution is as such not possible if the ammonia is only added in stoichiometric amounts since all added ammonia is used up in reacting with the sulfuroxides. However, the formed ammonium carbonate is decomposed again into its gaseous components as already noticed. This occurs particularly during the further treatment of the salt solution formed in the washing tower, such treatment being for instance oxidation, thermal treatments, crystallization, etc. These components according to the invention are again added to the flue gas when the same passes into the washing solution. In other words, if by a one-time brief excess dosage of ammonia at the beginning of the operation, a certain amount of ammonium carbonate is produced in the washing solution, this ammonium carbonate will again be decomposed by the above treatment steps. The decomposition products, that is ammonium, water vapor and carbon dioxide are again then reintroduced into the flue gas current which enters the washing tower. Thus, there is formed an internal ammonia circuit which is superposed to the overall operation. In spite of the stoichiometric ammonia addition during the development of the operation, an ammonia excess is thus maintained in the washing tower provided that minor operating losses of ammonia, for instance through the discharge of gases during extended periods of time, are compensated as soon as they occur.

Thus, the surprising result is obtained that even with a high ammonium carbonate solution no discernible ammonia partial pressure in the overlying gas occurs. Thus, variations of the load will no longer affect the degree of desulfurization without the requirement of specific adjustments. All this is accomplished without the undesirable increase of ammonia pressure in the gas.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for the desulfurization of a flue gas by means of an ammonia-containing aqueous washing solution, said flue gas containing sulfur dioxide, carbon dioxide and other acidic components, said process comprising adding ammonia to the washing solution in the stoichiometrically necessary amount for reaction with the sulfur oxides; and maintaining 2-60% by weight of ammonium carbonate in the washing solution by feeding back into said flue gas when said flue gas enters the washing process the ammonia, water vapor and carbon dioxide gaseous decomposition products of ammonium carbonate formed during the washing process so as to cause reformation of ammonium carbonate in the washing solution.

2. The process of claim 1, wherein the amount of ammonia to be added is based on the carbon in the washing solution as a measure of the carbon dioxide reaction of the flue gas with the ammonia whereby the ammonium carbonate is formed.

3. The process of claim 1, wherein over and above said stoichiometric amount of ammonia a single excess dosage of ammonia is added at the beginning of the wash process so as to permit the desired amount of ammonium carbonate to form.

4. The process of claim 1, wherein said decomposition of the formed ammonium carbonate is caused by oxidation, thermal treatment or crystallization during treatment of the salt solutions formed in the process by reaction of neutralizing components in the washing solution with acidic components of the flue gases.

5. The process of claim 1, wherein minor losses of ammonia during the process are replenished through introduction of fresh ammonia.

6. The process of claim 1, wherein the level of the ammonium carbonate is maintained at 5 to 30% of the solution.

* * * * *